Feb. 20, 1951      J. H. HAMMOND, JR      2,542,329
MAGNETIC BOTTLE OPENER

Filed July 13, 1948      3 Sheets—Sheet 1

Inventor
JOHN HAYS HAMMOND, JR.

By
Attorney

Feb. 20, 1951 J. H. HAMMOND, JR 2,542,329
MAGNETIC BOTTLE OPENER
Filed July 13, 1948 3 Sheets-Sheet 2
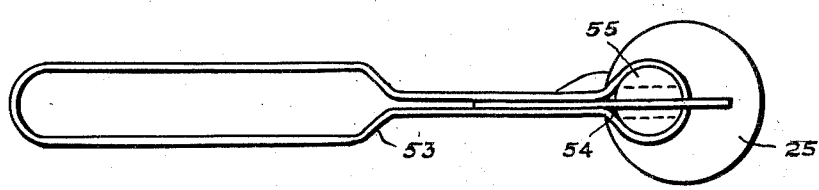
Fig. 9.
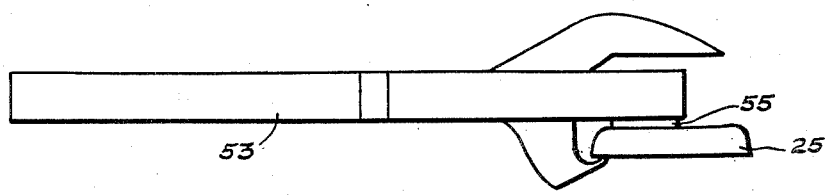
Fig. 10.
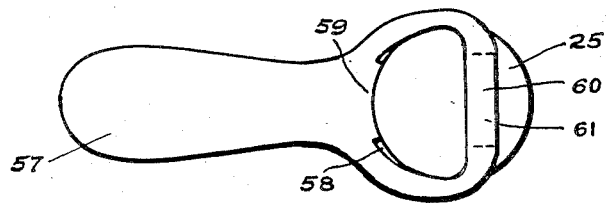
Fig. 11.
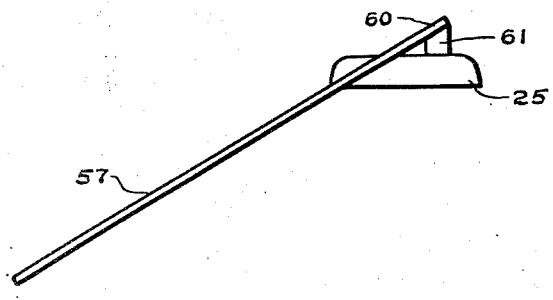
Fig. 12.
Inventor
JOHN HAYS HAMMOND, JR.
By 
Attorney Feb. 20, 1951 J. H. HAMMOND, JR 2,542,329
MAGNETIC BOTTLE OPENER
Filed July 13, 1948 3 Sheets-Sheet 3
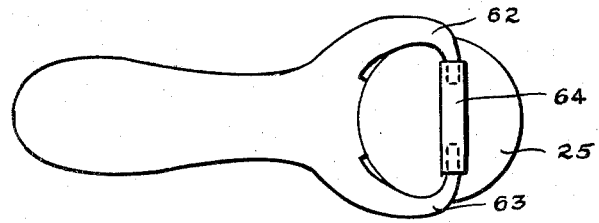
Fig.13.
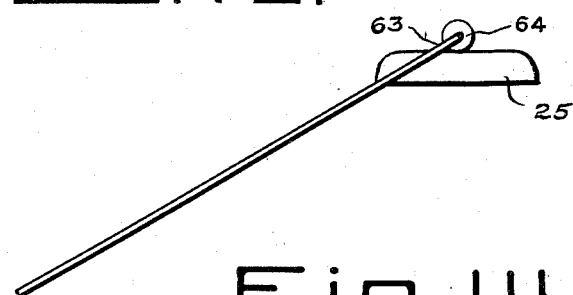
Fig.14.
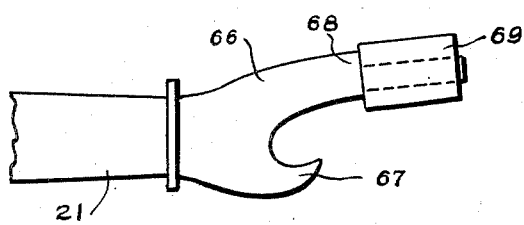 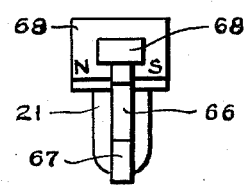
Fig.15. Fig.16.
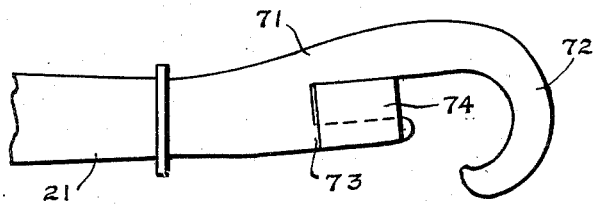 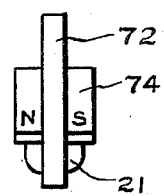
Fig.17. Fig.18.
Inventor
JOHN HAYS HAMMOND, JR.
By
Attorney Patented Feb. 20, 1951

2,542,329

UNITED STATES PATENT OFFICE 2,542,329

MAGNETIC BOTTLE OPENER

John Hays Hammond, Jr., Gloucester, Mass.

Application July 13, 1948, Serial No. 38,461

1 Claim. (Cl. 81—3.46)

This invention relates to bottle openers and more particularly to a bottle opener provided with a magnetized element for holding the top of the bottle to the opener after it has been removed from the bottle.

The invention also consists in certain new and original features of construction and combinations of parts hereinafter set forth and claimed.

The nature of the invention as to its objects and advantages, the mode of its operation and the manner of its organization may be better understood by referring to the following description taken in connection with the accompanying drawings forming a part thereof, in which Fig. 1 is a side elevation of a magnetic bottle opener constructed in accordance with this invention.

Fig. 9 is a top plan view of another modified form of magnetic bottle opener,

Fig. 10 is a side elevation of the opener of Fig. 9.

Fig. 11 is a top plan view of another modified form of magnetic bottle opener,

Fig. 12 is a side elevation of the opener of Fig. 11.

Fig. 13 is a top plan view of another modified form of magnetic bottle opener,

Fig. 14 is a side elevation of the opener of Fig. 13.

Fig. 15 is a side elevation of another modified form of magnetic bottle opener.

Fig. 16 is an end view of the opener of Fig. 15.

Fig. 17 is a side elevation of another modified form of magnetic bottle opener.

Fig. 18 is an end view of the opener of Fig. 17.

Like reference characters denote like parts in the several figures of the drawings.

In the following description parts will be identified by specific names for convenience, but they are intended to be generic in their application to similar parts.

Figure 1:
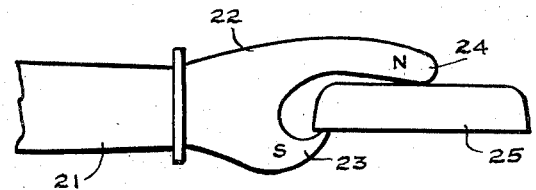
Figure 2:
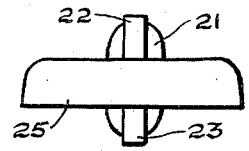
Fig. 2 is an end view of the opener of Fig. 1.

Referring to the accompany drawings and more particularly to Figs. 1 and 2 a bottle opener of the usual design is shown as comprising a handle 21 to which is attached a claw 22 having two fingers 23 and 24 and shaped to fit over a metal bottle cap 25 of the crown type, such caps are made of iron usually tin plated and are secured to the bottle by their crimped skirts. The handle 21 is non-magnetic while the claw is made of magnetic material, such for example as Alnico. The claw 22 is magnetized so that the finger 24 will be a north pole and the finger 23 a south pole or vice-versa.

In the operation of the bottle opener shown in Figs. 1 and 2 the opener is used in the usual way to grip and spread the skirt and remove the cap 25 from the top of the bottle (not shown). After the cap 25 is removed from the bottle it completes the magnetic circuit between the fingers 23 and 24 and will adhere to the claw 22 due to its magnetic action, thus preventing the cap from dropping to the floor. In this way the cap may be removed from the opener and replaced on the bottle if so desired.

Figure 3:
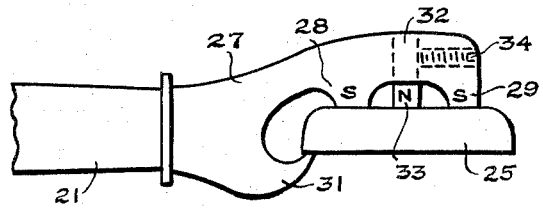
Fig. 3 is a side elevation of a modified form of magnetic bottle opener.
Figure 4:
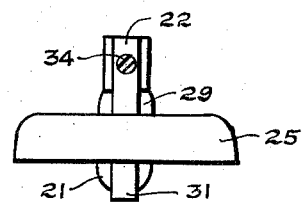
Fig. 4 is an end view of the opener of Fig. 3.

Referring to the modified form of the invention shown in Figs. 3 and 4, to the handle 21 is attached a modified form of claw 27 made of magnetic material and having three fingers 28, 29 and 31. A hole 32 is provided in the claw 27 in which is inserted a cylindrical magnet 33 which is held in place by a set screw 34.

In the operation of the modified form of the invention depicted in Figs. 3 and 4 if the lower end of the magnet 33 is a north pole the two fingers 28 and 29 will become south poles or vice-versa. When the cap 25 is removed from the bottle in the usual way it will complete the magnetic circuit from the magnet 33 to the two fingers 28 and 29 and adhere thereto. If the magnet 33 becomes weak and it is desired to replace it with a new magnet the set screw 34 may be loosened, the magnet 33 replaced with a new magnet, and the set screw again tightened to hold it in place.

Figure 5:
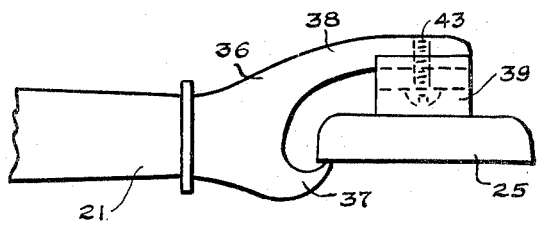
Fig. 5 is a side elevation of another modified form of magnetic bottle opener.
Figure 6:
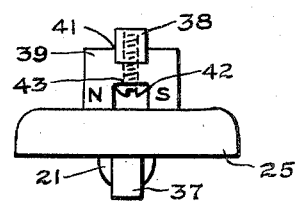
Fig. 6 is an end view of the opener of Fig. 5.

Referring to the modified form of bottle opener shown in Figs. 5 and 6 a modified form of claw 36 having two fingers 37 and 38, is attached to the handle 21. A cylindrical magnet 39, provided with two grooves 41 and 42, is attached to the finger 38 by means of a screw 43. The claw 36 is made of non-magnetic material. The magnet 39 is so magnetized that the parts on either side of the groove 42 will be north and south poles.

When the cap 25 is removed from the bottle by this opener it completes the magnetic circuit between the two poles of the magnet 39 and adheres thereto. If the magnet 39 becomes weak and it is desired to replace it was a new magnet the screw 43 is removed, a new magnet is put in place and secured by means of the screw 43.

Figure 7:
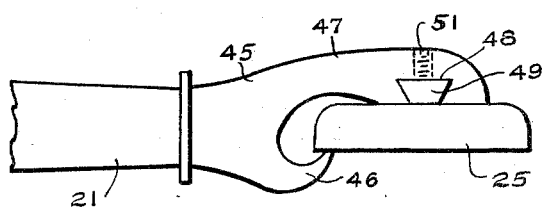
Fig. 7 is a side elevation of another modified form of magnetic bottle opener.
Figure 8:
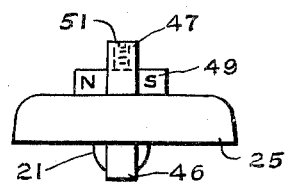
Fig. 8 is an end view of the opener of Fig. 7.

Referring to the modified form of the invention shown in Figs. 7 and 8 a modified form of claw 45, provided with two fingers 46 and 47, is attached to the handle 21. The finger 47 is provided with a wedge shaped aperture 48 in which is slidably mounted a wedge shaped magnet 49 having north and south poles at two ends. The magnet 49 is held in position by a set screw 51. If it is desired to replace the magnet 49 the set screw 41 is loosened, the magnet 49 is replaced by a new one and the set screw 51 is tightened.

Referring to the modified form of the invention shown in Figs. 9 and 10 a standard type of bottle opener 53 is provided with a circular opening 54 into which snugly fits a cylindrical magnet 55 of the same general type as the magnet 39, shown in Figs. 5 and 6.

In the operation of the bottle opener depicted in Figs. 9 and 10 the opener is operated in the usual manner and when the cap 25 is removed from the bottle it will adhere to the magnet 55. If it is desired to replace the magnet 55 it is removed by applying suitable pressure from above and is replaced by a new magnet which is pressed into the aperture 54.

Referring to the modified form of the invention shown in Figs. 11 and 12 a standard type of bottle opener in the form of a flat metal piece 57 having an opening 58 stamped therein to form a shoulder 59 which engages beneath the cap skirt and a cap engaging strip 60, is provided with a rhomboidal shaped magnet 61 which is securely attached to the strip 60.

In the operation of the modified form of the invention shown in Figs. 11 and 12 the opener is operated in the usual manner and when the cap 25 is removed from the bottle it will adhere to the magnet 61.

Referring to the modified form of the invention shown in Figs. 13 and 14 a standard flat metal type of bottle opener is provided with two fingers 62 and 63. The ends of the fingers 62 and 63 are cylindrically shaped and fit into holes in the ends of a cylindrical magnet 64, into which they are pressed during assembly.

In the operation of the form of the invention shown in Figs. 13 and 14, the opener is operated in the usual manner and when the cap 25 is removed from the bottle it will adhere to the magnet 64.

Referring to the modified form of the invention shown in Figs. 15 and 16 a modified form of claw 66, provided with two fingers 67 and 68, is attached to the handle 21. The finger 68 is formed at a slight upward angle to the handle 21. The end of the finger 68 is rectangular shaped and has a slight taper. Tightly fitting over the tapered end of the finger 68 is a U-shaped magnet 69 having north and south poles as indicated in Fig. 16 which are positioned to engage the cap.

In the operation of the modified form of the invention depicted in Figs. 15 and 16 the opener is operated in the usual manner and when the cap is removed from the bottle it will adhere to the magnet 69. If it is desired to replace the magnet 69 it is removed from the finger 68 and replaced by a new magnet which is wedged in place.

Referring to the modified form of the invention shown in Figs. 17 and 18 a modified form of claw 71, provided with two fingers 72 and 73 is attached to the handle 21. The finger 72 is formed in the shape of a hook while the finger 73 is straight. Tightly fitting over the straight finger 73 and wedged between it and the base of the finger 72 is a U-shaped magnet 74, having north and south poles as indicated in Fig. 18.

In the operation of the modified form of the invention shown in Figs. 17 and 18 the opener is operated by engaging the end of the hook shaped finger 72 under the outer edge of the cap. The finger 73 and magnet 74 will then rest on the top of the cap. The handle 21 is then depressed causing the hook 72 to lift the cap off the top of the bottle, the cap adhering to the magnet 74. If it is desired to replace the magnet 74 is removed from the finger 73 and replaced by a new magnet which is wedged in place.

Although only a few of the various forms in which this invention may be embodied have been shown herein, it is to be understood that the invention is not limited to any specific construction but might be embodied in various forms without departing from the spirit of the invention or the scope of the appended claim.

What is claimed is:

A bottle opener for crown caps or the like having a metal shell provided with a flat top surface and a crimped securing skirt, comprising a handle having at one end a head having a member to engage the top of the cap for a fulcrum and another member to engage beneath the skirt for loosening the same and unseating the cap when the handle is tilted about said fulcrum, and a permanent magnet carried by said first member and having a pair of poles disposed to engage the flat top surface of the cap at a point remote from the skirt to cause the cap to adhere thereto magnetically when unseated.

JOHN HAYS HAMMOND, Jr.

REFERENCES CITED

The following references are of record in the file of this patent:

UNITED STATES PATENTS

| Number | Name | Date |
|---|---|---|
| D. 152,822 | Overshiner | Feb. 22, 1949 |
| 928,156 | Rydquist | July 13, 1909 |
| 1,492,908 | Trumbo | May 6, 1924 |
| 1,582,442 | White | Apr. 27, 1926 |
| 2,116,306 | Dziembowski | May 3, 1938 |
| 2,437,234 | Webb | Mar. 2, 1948 |

OTHER REFERENCES 12 in 1 "Tool Shop," page 70, Popular Science of Feb. 1948.